(12) United States Patent
Stewart et al.

(10) Patent No.: US 11,202,113 B2
(45) Date of Patent: Dec. 14, 2021

(54) LOW ADJACENT CHANNEL INTERFERENCE MODE FOR A DIGITAL TELEVISION SYSTEM

(71) Applicant: INTERDIGITAL CE PATENT HOLDINGS, Paris (FR)

(72) Inventors: John Sidney Stewart, Indianapolis, IN (US); Max Ward Muterspaugh, Westfield, IN (US)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 293 days.

(21) Appl. No.: 14/913,399

(22) PCT Filed: Aug. 11, 2014

(86) PCT No.: PCT/US2014/050477
§ 371 (c)(1),
(2) Date: Feb. 22, 2016

(87) PCT Pub. No.: WO2015/026547
PCT Pub. Date: Feb. 26, 2015

(65) Prior Publication Data
US 2016/0212451 A1   Jul. 21, 2016

Related U.S. Application Data

(60) Provisional application No. 61/868,786, filed on Aug. 22, 2013, provisional application No. 61/869,143, (Continued)

(51) Int. Cl.
*H04N 21/2385*   (2011.01)
*H04N 21/438*   (2011.01)
(Continued)

(52) U.S. Cl.
CPC ....... *H04N 21/2385* (2013.01); *H04L 5/0044* (2013.01); *H04L 5/0066* (2013.01);
(Continued)

(58) Field of Classification Search
None
See application file for complete search history.

(56) References Cited

U.S. PATENT DOCUMENTS 5,488,632 A * 1/1996 Mason ................ H04L 27/2602
348/E7.038
8,121,017 B2   2/2012 Stadelmeier et al.
(Continued)

FOREIGN PATENT DOCUMENTS

| EP | 0869647 A2 | 10/1998 |
|----|------------|---------|
| EP | 2224659 A1 | 9/2010 |
| EP | 2541927 B1 | 10/2018 |

OTHER PUBLICATIONS

ETSI, "ETSI EN 302 755 Final Draft Digital Video Broadcasting (DVB); Frame structure channel coding and modulation for a second generation digital terrestrial television broadcasting system (DVB-T2)," Oct. 31, 2010, Retrieved from the Internet: URL:http://www.etsi.org on Oct. 6, 2014.
(Continued)

*Primary Examiner* — Jason K Lin
(74) *Attorney, Agent, or Firm* — Volpe Koenig

(57) ABSTRACT

Methods and apparatuses are provided with a solution to adjacent channel interference when a multi-carrier modulation system (e.g., OFDM) replaces a legacy modulation system and co-exists with it for a period of time. The adjacent channel interference can be reduced by blocking (setting to 0) and not using some of the carriers at the edge of the spectrum during the transition period. This effectively reduces the bandwidth of the channel and consequently, the adjacent channel interference caused by the multi-carrier
(Continued)

signal. However, at some point in time, the legacy system will be turned off and the adjacent channel interference into the original channels will no longer be important. The present principles propose a mechanism to allow for the unblocking of the removed carriers once the interference problem becomes less strict.

34 Claims, 10 Drawing Sheets

Related U.S. Application Data filed on Aug. 23, 2013, provisional application No. 61/882,827, filed on Sep. 26, 2013, provisional application No. 61/891,563, filed on Oct. 16, 2013.

(51) Int. Cl.
*H04L 27/26* (2006.01)
*H04L 5/00* (2006.01)

(52) U.S. Cl.
CPC ........ *H04L 5/0094* (2013.01); *H04L 27/2627* (2013.01); *H04N 21/4382* (2013.01)

(56) References Cited

U.S. PATENT DOCUMENTS

| | | | |
|---|---|---|---|
| 8,130,851 B2 | 3/2012 | Ma et al. | |
| 8,675,570 B2 | 3/2014 | Cai | |
| 2002/0006167 A1* | 1/2002 | McFarland | H04L 1/0002 375/260 |
| 2003/0009765 A1* | 1/2003 | Linden | H04H 20/40 725/95 |
| 2006/0130113 A1* | 6/2006 | Carlucci | H04N 7/173 18 725/118 |
| 2006/0160498 A1* | 7/2006 | Sudo | H03M 13/37 455/103 |
| 2006/0171390 A1* | 8/2006 | La Joie | H04L 12/2801 370/390 |
| 2008/0070586 A1* | 3/2008 | Kermoal | H04L 5/003 455/452.2 |
| 2008/0287068 A1* | 11/2008 | Etemad | H04L 5/0007 455/68 |
| 2009/0135922 A1 | 5/2009 | Kang et al. | |
| 2009/0245392 A1* | 10/2009 | Leung | H04L 5/0044 375/240.27 |
| 2010/0150180 A1* | 6/2010 | Arambepola | H04L 47/14 370/503 |
| 2011/0002422 A1 | 1/2011 | Cheng et al. | |
| 2011/0019722 A1* | 1/2011 | Amirkhany | H04L 25/14 375/219 |
| 2012/0236933 A1* | 9/2012 | Saitoh | H04N 5/4401 375/240.02 |
| 2014/0248917 A1* | 9/2014 | Scipione | H04W 72/0406 455/509 |
| 2014/0307697 A1* | 10/2014 | Beale | H04L 5/0044 370/329 |
| 2015/0143439 A1* | 5/2015 | Fay | H04N 21/2393 725/95 |

OTHER PUBLICATIONS

ATSC, "ATSC 3.0 'Physical Layer' Technical Proposals Being Evaluated," Oct. 31, 2013, Retrieved from the Internet: URL:http://atsc.org/newsletter/2013, retrieved on Oct. 7, 2014, 10 pages.

ATSC, "Final Report on ATSC 3.0 Next Generation Broadcast Television," Sep. 21, 2011, retrieved from the Internet: URL:http://www.atsc.org/cms on Oct. 8, 2014, 40 pages.

Wikipedia, "Orthogonal Frequency-Division Multiplexing," Aug. 14, 2013, Retrieved from the Internet: URL:http//en.wikipedia.org on Oct. 7, 2014, 19 pages.

ATSC "Digital Television Standard, Part 2—RF/Transmission System Characteristics", Doc.# A/53, Part 2:2011, Dec. 15, 2011.

ETSI—European Telecommunications Standards Institute. "Digital Video Broadcasting (DVB); Frame structure channel coding and modulation for a second generation digital terrestrial television broadcasting system (DVB-T2)", doc. # ETSI EN 302 755 V1.3.1 (Apr. 2012).

International Search Report dated Oct. 17, 2014.

ETSI, "Digital Video Broadcasting (DVB); IP Datacast over DVB-H: Notification Framework," ETSI TS 102 832 V1.2.1 KJanuary 2010).

ETSI, "Digital Video Broadcasting (DVB); Implementation guidelines for a second generation digital terrestrial television broadcasting system (DVB-T2)," ETSI TS 102 831 V1.1.1 (Oct. 2010).

ETSI, "Digital Video Broadcasting (DVB); Implementation guidelines for a second generation digital terrestrial television broadcasting system (DVB-T2)," ETSI TS 102 831 V1.2.1 (Aug. 2012).

NTT Docomo, "Interference Coordination for Non-CA-based Heterogeneous Networks," 3GPP TSG RAN WG1 #60bis, R1-102307, Beijing, China (Apr. 12-16, 2010).

\* cited by examiner

LOW ADJACENT CHANNEL INTERFERENCE MODE FOR A DIGITAL TELEVISION SYSTEM

CROSS-REFERENCE TO RELATED APPLICATIONS

This application claims the benefit, under 35 U.S.C. § 365 of International Application PCT/US14/050477, filed 11 Aug. 2014, which was published in accordance with PCT Article 21(2) on 26 Feb. 2015 in English, and which claims the benefit of U.S. provisional patent application No. 61/868,786 filed 22 Aug. 2013. This application also claims the benefit of the U.S. provisional patent application No. 61/869,143, filed on 23 Aug. 2013, claims the benefit of U.S. provisional patent application No. 61/882,827, filed 26 Sep. 2013, and claims the benefit of U.S. provisional patent application No. 61/891,563, filed 16 Oct. 2013. The provisional patent applications are expressly incorporated by reference herein in their entirety for all purposes.

TECHNICAL FIELD

The present principles relate to communication systems and in particular, to adjacent channel interference in digital television systems.

BACKGROUND

On Mar. 26, 2013, the Advanced Television Systems Committee (ATSC), which proposes terrestrial broadcasting digital television standards in the U.S., announced a call for proposals for the next generation (named ATSC 3.0) physical layer. ATSC 3.0 will provide even more services to the viewer and increased bandwidth efficiency and compression performance, which requires breaking backwards compatibility with the currently deployed version, ATSC A/53, which comprises an 8-VSB (8 level, Vestigial Sideband) modulation system. ATSC 3.0 is expected to emerge within the next decade and it intends to support delivery to fixed devices of content with video resolutions up to Ultra High Definition 3840×2160 at 60 frames per second (fps). The intention of the system is to support delivery to portable, handheld and vehicular devices of content with video resolution up to High Definition 1920×1080 at 60 fps. The system is also expected to support lower video resolutions and frame rates.

One of the main issues associated with the current ATSC standard is the vulnerability of the 8-VSB modulation system to multipath propagation and Doppler Effect. These impairments are present in the broadcast transmission environment, particularly in large metropolitan cities, and in the delivery to portable/handheld/vehicular devices (which ATSC intends to support). It is a consensus that multi-carrier modulation systems like, for example, the OFDM (orthogonal frequency division multiplex) modulation, are better choices of modulation to combat these impairments.

OFDM is a method of encoding digital data on multiple carrier frequencies. In OFDM, the sub-carrier frequencies are chosen so that the sub-carriers are orthogonal to each other, meaning that cross-talk between the sub-channels is eliminated and inter-carrier guard bands are not required. This greatly simplifies the design of both the transmitter and the receiver; unlike conventional FDM, a separate filter for each sub-channel is not required. The orthogonality allows for efficient modulator and demodulator implementation using the FFT (Fast Fourier Transform) algorithm on the receiver side, and inverse FFT on the transmitter side. In particular, the size of the FFT identifies the number of carriers in the OFDM modulation system. Frequency selective channels are characterized either by their delay spread or coherence bandwidth. In a single carrier system like 8-VSB, a single fade or interference can cause the whole link to fail, but in multi-carrier systems, like OFDM, only a few of the total sub carriers will be affected. This way, multipath fading can be easily eliminated in OFDM, with simpler equalization techniques than in single carrier systems.

When a new broadcast system is deployed, as it will eventually be the case for ATSC 3.0, it must co-exist with the existing system for some time. In addition, there is usually some channel re-alignment involved where channels are moved around the available spectrum to accommodate both new and existing channels. This planning process can be quite difficult as it must take into account the interference between the various channels when planning where the channels can be located and the need to maintain compatibility with the installed base of the legacy system during the transition process. It is particularly difficult when the legacy system has a more strict spectral mask for each channel. One impairment which must be considered is the adjacent channel interference. The present principles propose a solution to the problem of adjacent channel interference for a multi-carrier modulation system (e.g. OFDM) replacing an existing standard, and co-existing with it for a period of time.

SUMMARY

The present principles describe methods and apparatuses which provide a solution to adjacent channel interference when a multi-carrier modulation system (e.g., OFDM) replaces a legacy modulation system (e.g., ATSC) and co-exists with it for a period of time. The adjacent channel interference can be reduced by blocking (setting to 0) and not using some of the carriers at the edge of the spectrum during the period of transition from the legacy system to the multi-carrier system. This effectively reduces the bandwidth of the channel and consequently, the adjacent channel interference caused by the multi-carrier signal, without the need of complex and expensive filtering, while maintaining compatibility with the spectral mask of the legacy system. However, at some point in time, the legacy system will be turned off and the adjacent channel interference into the original channels will no longer be important. The present principles propose a mechanism to allow for the unblocking of the removed carriers once the interference problem becomes less strict, that is, when the legacy system is finally turned off.

According to one aspect of the present principles, an apparatus for transmitting a multi-carrier modulated signal is provided including: a source (111, 200) for providing data, the data including a bandwidth parameter, the bandwidth parameter including a normal bandwidth mode, at least one reduced bandwidth mode and at least one extended bandwidth mode; and a multi-carrier modulator (114) for modulating the data by allocating the data to a plurality of carriers on a physical channel according to the bandwidth parameter to create the modulated signal. The at least one reduced bandwidth mode has a smaller number of carriers than the normal bandwidth mode and the at least one extended bandwidth mode has a larger number of carriers than the normal bandwidth mode. The apparatus may further include: a channel encoder (113) for at least channel encoding the data prior to the multi-carrier modulator. At least one reduced bandwidth mode may be created by eliminating normal bandwidth carriers evenly on both edges of the spectrum of the modulated signal. At least one reduced bandwidth mode may be created by eliminating normal bandwidth carriers on only one edge of the spectrum of the modulated signal. At least one reduced bandwidth mode may be created by eliminating normal bandwidth carriers unevenly on both edges of the spectrum of the modulated signal. At least one reduced carrier mode may be used for reducing adjacent channel interference on at least one adjacent channel to the physical channel carrying the multi-carrier signal. At least one adjacent channel may carry a modulated signal satisfying a spectral mask for a legacy communication system. The legacy communication system may be ATSC and the multi-carrier modulation may be OFDM.

According to one aspect of the present principles, an apparatus for receiving a multi-carrier modulated signal is provided including: a multi-carrier demodulator (124, 310) for demodulating the modulated signal, the signal including a plurality of signaling data and other than signaling data modulated symbols, the modulated symbols including a plurality of carriers on a physical channel, to obtain demodulated data symbols, wherein demodulating the other than signaling data symbol is performed according to a bandwidth parameter; and a signaling data detector (322) for detecting signaling data from demodulated signaling data symbols and for recovering the bandwidth parameter, the bandwidth parameter including a normal bandwidth mode, at least one reduced bandwidth mode and at least one extended bandwidth mode. The at least one reduced bandwidth mode has a smaller number of carriers than the normal bandwidth mode and the at least one extended bandwidth mode has a larger number of carriers than the normal bandwidth mode. The apparatus may further include: a channel decoder (123, 320) for at least channel decoding the demodulated data symbols after the multi-carrier demodulator. At least one reduced bandwidth mode may be created by eliminating normal bandwidth carriers evenly on both edges of the spectrum of the modulated signal and the demodulator disregards eliminated carriers. At least one reduced bandwidth mode may be created by eliminating normal bandwidth carriers on only one edge of the spectrum of the modulated signal and the demodulator disregards eliminated carriers. At least one reduced bandwidth mode may be created by eliminating normal bandwidth carriers unevenly on both edges of the spectrum of the modulated signal and the demodulator disregards eliminated carriers. At least one reduced carrier mode may be used for reducing adjacent channel interference on at least one adjacent channel to the physical channel carrying the multi-carrier signal. At least one adjacent channel may carry a modulated signal satisfying a spectral mask for a legacy communication system. The legacy communication system may be ATSC and the multi-carrier modulation may be OFDM. The demodulator for the signaling data symbols which do not contain the bandwidth parameter may perform demodulation according to the bandwidth parameter.

According to one aspect of the present principles, a method for transmitting a multi-carrier modulated signal is provided including: providing data (910), the data including a bandwidth parameter, the bandwidth parameter including a normal bandwidth mode, at least one reduced bandwidth mode and at least one extended bandwidth mode; and multi-carrier modulating (940) the data by allocating the data to a plurality of carriers on a physical channel according to the bandwidth parameter to create the modulated signal. The at least one reduced bandwidth mode has a smaller number of carriers than the normal bandwidth mode and the at least one extended bandwidth mode has a larger number of carriers than the normal bandwidth mode. The method may further include: channel encoding (930) the data prior to multi-carrier modulating. At least one reduced bandwidth mode may be created by eliminating normal bandwidth carriers evenly on both edges of the spectrum of the modulated signal. At least one reduced bandwidth mode may be created by eliminating normal bandwidth carriers on only one edge of the spectrum of the modulated signal. At least one reduced bandwidth mode may be created by eliminating normal bandwidth carriers unevenly on both edges of the spectrum of the modulated signal. At least one reduced carrier mode may be used for reducing adjacent channel interference on at least one adjacent channel to the physical channel carrying the multi-carrier signal. The at least one adjacent channel may carry a modulated signal satisfying a spectral mask for a legacy communication system. The legacy communication system may be ATSC and the multi-carrier modulation may be OFDM.

According to one aspect of the present principles, a method for receiving a multi-carrier modulated signal is provided including: multi-carrier demodulating (1010) the modulated signal, the signal including a plurality of signaling data and other than signaling data modulated symbols, the modulated symbols including a plurality of carriers on a physical channel, to obtain demodulated data symbols, wherein demodulating the other than signaling data symbol is performed according to a bandwidth parameter; and detecting signaling data (1030) from demodulated signaling data symbols and for recovering the bandwidth parameter, the bandwidth parameter including a normal bandwidth mode, at least one reduced bandwidth mode and at least one extended bandwidth mode. The at least one reduced bandwidth mode has a smaller number of carriers than the normal bandwidth mode and the at least one extended bandwidth mode has a larger number of carriers than the normal bandwidth mode. The method may further include: channel decoding (1020) the demodulated data symbols after the multi-carrier demodulator. At least one reduced bandwidth mode may be created by eliminating normal bandwidth carriers evenly on both edges of the spectrum of the modulated signal and the demodulator disregards eliminated carriers. At least one reduced bandwidth mode may be created by eliminating normal bandwidth carriers on only one edge of the spectrum of the modulated signal and the demodulator disregards eliminated carriers. At least one reduced bandwidth mode may be created by eliminating normal bandwidth carriers unevenly on both edges of the spectrum of the modulated signal and the demodulator disregards eliminated carriers. At least one reduced carrier mode may be used for reducing adjacent channel interference on at least one adjacent channel to the physical channel carrying the multi-carrier signal. At least one adjacent channel may carry a modulated signal satisfying a spectral mask for a legacy communication system. The legacy communication system may be ATSC and the multi-carrier modulation may be OFDM. Demodulating the signaling data symbols which do not contain the bandwidth parameter may be performed according to the bandwidth parameter.

Additional features and advantages of the present principles will be made apparent from the following detailed description of illustrative embodiments which proceeds with reference to the accompanying figures.

BRIEF DESCRIPTION OF THE DRAWINGS

The present principles may be better understood in accordance with the following exemplary figures briefly described below.

DETAILED DISCUSSION OF THE EMBODIMENTS

The present principles relate to communication systems and in particular, to adjacent channel interference in digital television systems. Other than the inventive concept, several elements hereby discussed are well known and will not be described in detail. For example, other than the inventive concept, familiarity with the second generation digital terrestrial television broadcasting system for Digital Video Broadcasting (DVB-T2) is assumed and not described herein. In this regard, familiarity with the standards and recommended practices of ETSI EN 302 755 and ETSI TS 102 832 is assumed and not described herein. Also, familiarity with digital terrestrial television broadcasting system for the US (ATSC) is assumed and not described herein. In this regard, familiarity with the standards and recommended practices of ATSC A/53, A/153 and A/54 is assumed and not described herein. It should also be noted that the inventive concept may be implemented using conventional programming techniques, which, as such, will not be described herein.

Figure 1:
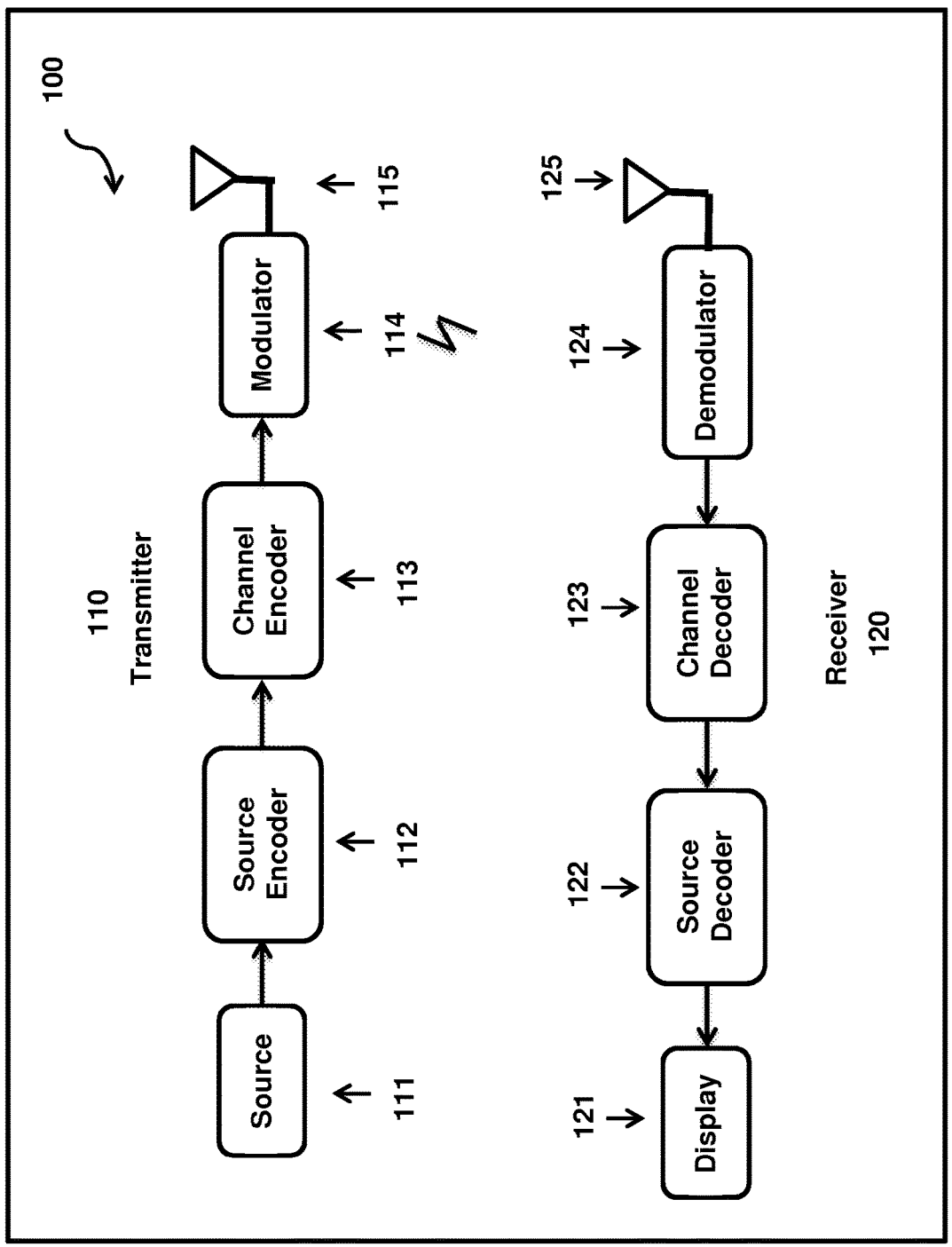
FIG. 1 illustrates a simplified block diagram of a general digital communication system applicable to the digital broadcasting channel.

FIG. 1 shows a simplified block diagram 100 of a general digital communication system applicable to the digital broadcasting channel, independent of the modulation system and system architecture. The transmitter device 110 includes the following components:

- a source 111 for the audio, video, signaling or control and other ancillary data (e.g., program guide);
- a source encoder 112, including audio and video encoders to compress the audio and video data;
- a channel encoder 113 including at least some of the functions of randomizing, interleaving, channel coding and frame mapping to process the compressed, signaling and ancillary digital data for robustness and to add levels of error correcting encoding functionality;
- a modulator 114 to convert the processed digital data into modulation symbols, which can be, for example, VSB (ATSC) or OFDM (DVB-T2). In addition, it includes the functionality of filtering and digital-to-analog (D/A) conversion; and
- an antenna 115 representing the functionalities of up-conversion, RF amplification and over-the-air broadcasting.

At the receiver device 120 of FIG. 1, the inverse functions of the transmitter are performed, including the following components:

- an antenna for reception 125, which includes the functionalities of over-the-air reception, RF down-conversion and tuning;
- a demodulator 124 to recover the digital data from the modulation symbols and includes the functionalities of analog-to-digital conversion (D/A), gain control, carrier and symbol timing recovery, equalization and header or preamble sync detection;
- a channel decoder 123 to recover the compressed and ancillary data by performing the inverse functionalities of the channel encoder, including error correcting decoding, de-interleaving and de-randomizing;
- a source decoder 122 to decompress the audio and video data, including video and audio decoders; and
- a display device 121 for audio/video viewing.

A skilled artisan will appreciate that a source encoder 112 and a channel encoder 113, although common in general communications systems, are not essential for a system according to the present principles. Similarly, depending on the transmitter, a source decoder 122 and a channel decoder 123, although common in general communications systems, are not essential for a system according to the present principles. In addition, the transmitter and receiver may not require an antenna, if the transmission system is other than over-the-air (e.g., over cable). Furthermore, a receiving device includes, but is not limited to: a television, a set-top box, a computer, a mobile phone, an automobile receiver and a tablet.

One of the main issues associated with the current ATSC standard for digital terrestrial broadcasting of television in the US is the vulnerability of the 8-VSB modulation system to multipath propagation and Doppler Effect. These impairments are common in the broadcast transmission environment, particularly in large metropolitan cities, and in the delivery to portable/handheld/vehicular devices (which ATSC intends to support). It is a consensus that multi-carrier modulation systems like, for example, the OFDM (orthogonal frequency division multiplex) modulation are better choices of modulation to combat these impairments.

The OFDM modulation is adopted in other digital terrestrial television standards, e.g., the DVB-T/DVB-T2 standards in Europe, and the ISDB-T standard in Japan. DVB-T, the $1^{st}$ generation of European DTT (Digital Terrestrial Television), is the most widely adopted and deployed standard. Since its publication in 1997, over 70 countries have deployed DVB-T services and 45 more have adopted (but not yet deployed) DVB-T. This well-established standard benefits from massive economies of scale and very low receiver prices. Like its predecessor, DVB-T2 uses OFDM (orthogonal frequency division multiplex) modulation with a large number of sub-carriers delivering a robust signal, and offers a range of different modes, making it a very flexible standard. DVB-T2 uses the same error correction coding as used in DVB-S2 and DVB-C2: LDPC (Low Density Parity Check) coding combined with BCH (Bose-Chaudhuri-Hocquengham) coding, offering a very robust signal. The number of carriers, guard interval sizes and pilot signals can be adjusted, so that the overheads can be optimized for any target transmission channel. DVB-T2 offers more robustness, flexibility and at least 50% more efficiency than any other DTT system. It supports SD, HD, UHD, mobile TV, or any combination thereof.

For the DVB-T2 system, there are several different FFT (Fast Fourier Transform) sizes to choose from, specifically, 1K, 2K, 4K, 8K, 16K and 32K. These sizes, together with the channel guard interval are defined by three signaling bits in the stream (S2 field 1), which are a part of the L1 pre-signaling data and transmitted in the P1 symbol (part of the preamble of each frame). As the size of the FFT increases, the roll-off of the spectrum gets increasingly sharper. Normally, for each FFT size, only a fixed number of the OFDM carriers are used per modulation symbol and at the edges of the spectrum, some of the carriers are not used to allow the spectrum to roll-off enough to not interfere into the adjacent channel. For the large FFT sizes (16K, 32K, etc.), the roll-off is very sharp allowing for some additional OFDM carriers to be utilized. At these higher FFT values, the DVB-T2 specification allows for either the normal number of carriers or an extended number of carriers to be used. This is signaled to the receiver using one bit of the L1 pre-signaling data. This one-bit field, called BWT_EXT. indicates whether the normal (0) or extended (1) carrier set is to be used. The exact number of carriers for each FFT size is given in the DVB-T2 specification.

When a new broadcast system is deployed, as it will eventually be the case for ATSC 3.0, one impairment which must be considered is the adjacent channel interference. For multi-carrier systems, it is possible to control the bandwidth of a channel by only utilizing a portion of the available carriers. The present principles propose to reduce or prevent adjacent channel interference by temporarily blocking (setting to 0) and not using (i.e., allocating data to) the carriers at the edges of the channel spectrum during the transition period in which both systems will co-exist. This effectively reduces the bandwidth of the channel and also has the effect of reducing adjacent channel interference caused by the multi-carrier signal without the need of complex and expensive filtering.

According to the present principles, apparatuses and methods are provided for a transmitter/transmitting and a receiver/receiving of a multi-carrier (e.g., OFDM) modulated signal which will co-exist with a pre-existing modulated signal in a transmission system for a period of time. The transmitter transmits a signal including signaling data including a bandwidth parameter which sets the number of carriers per modulated symbol to be a normal number, a plurality of extended numbers or a plurality of reduced numbers. The choice of the value of the bandwidth parameter and how many carriers to add (or eliminate) per bandwidth extended (or reduced) mode are a function of the pre-existing modulated signal and its installed base of transmitters and receivers. In particular, it is a function of the adjacent channel requirements of the pre-existing modulated signal and it is a function of the pre-existing transmitter and receiver filter requirements, which are generally established by a spectral mask. In addition, the value of the bandwidth parameter and how many carriers to add (or eliminate) per bandwidth extended (or reduced) mode are also a function of the intended FFT size of the multi-carrier system (which defines the total number of carriers over which the FFT is performed), since the roll-off factor may change with the total number of carriers. Furthermore, the choice of the bandwidth parameter and how many carriers to add (or eliminate) per bandwidth extended (or reduced) mode are also a function of the transmission power, distribution of transmitters in the broadcasting area, topography of the area, geographical allocation of the physical channels to transmitters, etc.

Figure 2:
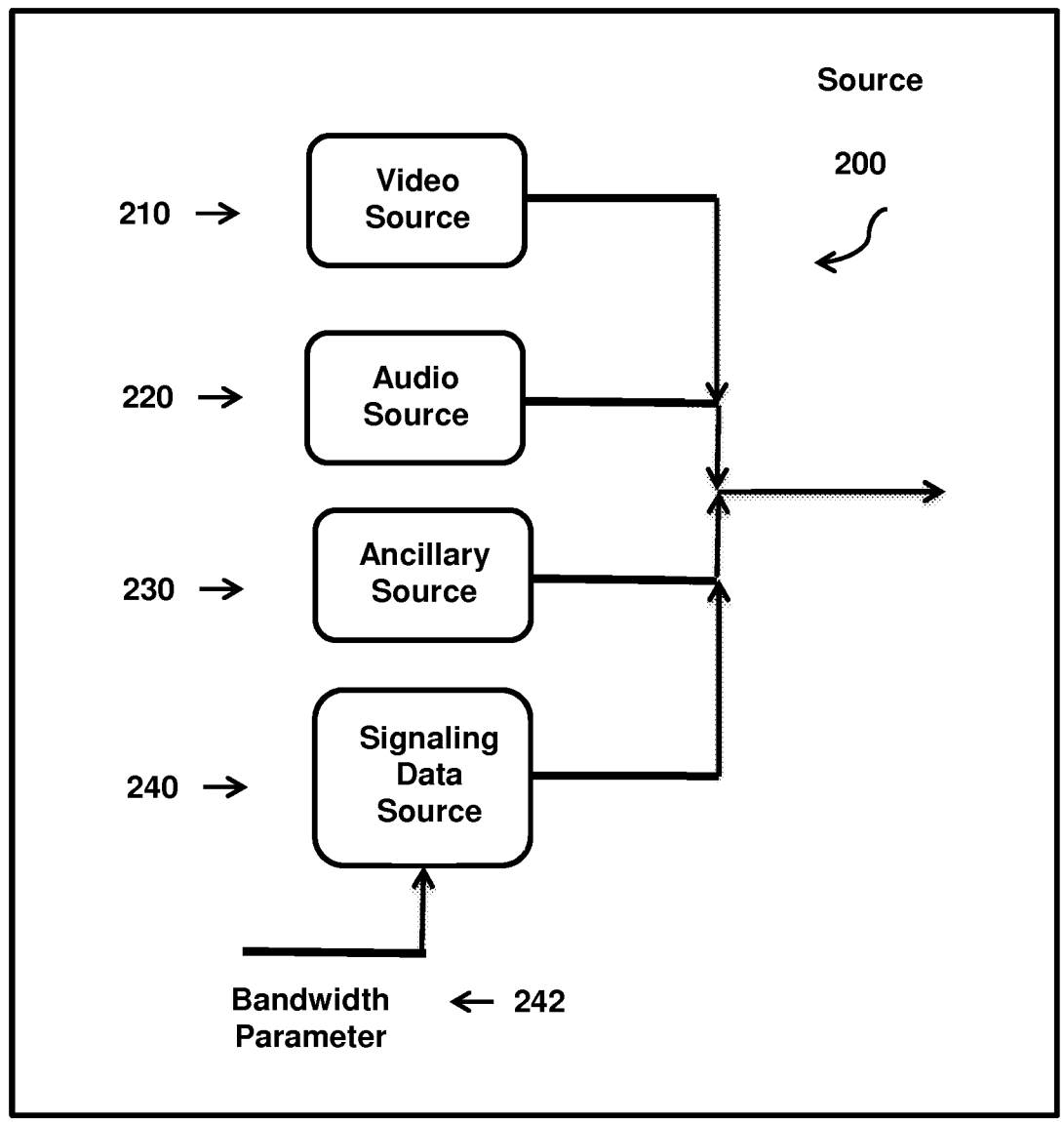
FIG. 2 illustrates an exemplary transmitter source according to the present principles.

FIG. 2 shows additional details of the source 111 of FIG. 1, including the video source 210, audio source 220, other ancillary data source 230 and a signaling data source or generator 240. The various sources may not be co-located and may be provided via various forms of data links (e.g., satellite, cable, microwave). The signaling data source is a function of the communication system and may have a number of fixed parameters as well as variable parameters which can be provided via a user interface or another type of input (e.g., a file, a remote data link). According to the present principles, the signaling data source includes a bandwidth parameter 242 which identifies one of the bandwidth modes of operation (normal, reduced or extended). Depending on the system, the signaling parameters may or not be channel encoded (in channel encoder 113). For example, in ATSC, signaling data like the field and segment sync are not channel encoded; in DVB-T2 all signaling parameters are channel encoded in the L1 pre and post signaling.

The modulator 114 according to the present principles creates a multi-carrier modulated signal consisting of a sequence of modulation symbols by allocating data to a plurality of carriers per modulation symbol, for signaling data and non-signaling data (video, audio, other ancillary data). In one embodiment of the present principles, the non-signaling data is allocated to the plurality of carriers per modulation symbol according to the bandwidth parameter mode. In another embodiment, modulation symbols which do not include the bandwidth parameter may also be created based on the bandwidth parameter. In one embodiment, the bandwidth parameter is sent in a preamble or header symbol for each frame of data, and is used to modulate all the remaining symbols of the multi-carrier transmission system, including the remaining data signaling symbols. At the receiver, the preamble symbol is first demodulated and the bandwidth parameter is recovered or extracted and used to demodulate all the remaining symbols in a frame.

According to the present principles, by setting the bandwidth parameter mode or value, the transmitter may establish a desirable bandwidth of operation with a reduced number of carriers per symbol in the multi-carrier channel to minimize, reduce or prevent adjacent channel interference. At the receiver, demodulation 124 is first performed to acquire the signaling data at a signaling data detector and set the receiver parameters accordingly. If the signaling data was channel encoded at the transmitter (at channel encoder 113), the signaling data detector must reside inside or after the channel decoder 123; otherwise, it can reside inside or after the demodulator 124. After the signaling data is recovered, the receiver extracts the various parameters contained in the signaling data to set its various modes of operation associated with its various data related blocks (including but not limited to modulation, e.g., constellation size, FFT size; FEC; interleaving; data distribution within the frame; etc.).

The parameters are then sent to the various blocks in order for demodulation and decoding to be performed on the video, audio and other ancillary data. Once the bandwidth parameter is extracted from the signaling data, the receiver is set to a mode of operation that is compatible with the transmission system and will know which carriers are present in the multi-carrier signal. When in a reduced carrier mode, the receiver will disregard a pre-determined number of carriers associated with that mode, for a certain FFT size. These disregarded carriers have not been transmitted (set to a value of 0 at the transmitter, i.e., data was not allocated to the carriers) resulting in a multi-carrier signal which will not cause adjacent channel interference in neighboring channels that are multi-carrier modulated (e.g. OFDM). Most importantly, it will not cause adjacent channel interference in neighboring channels with the pre-existing or legacy modulated signal (e.g., 8-VSB). This implies that the pre-existing installed base of transmitters and receivers, with their pre-existing filter requirements for adjacent channel interference, will not be affected by the introduction of the new multi-carrier modulated signals associated with a new transmission system.

Figure 3:
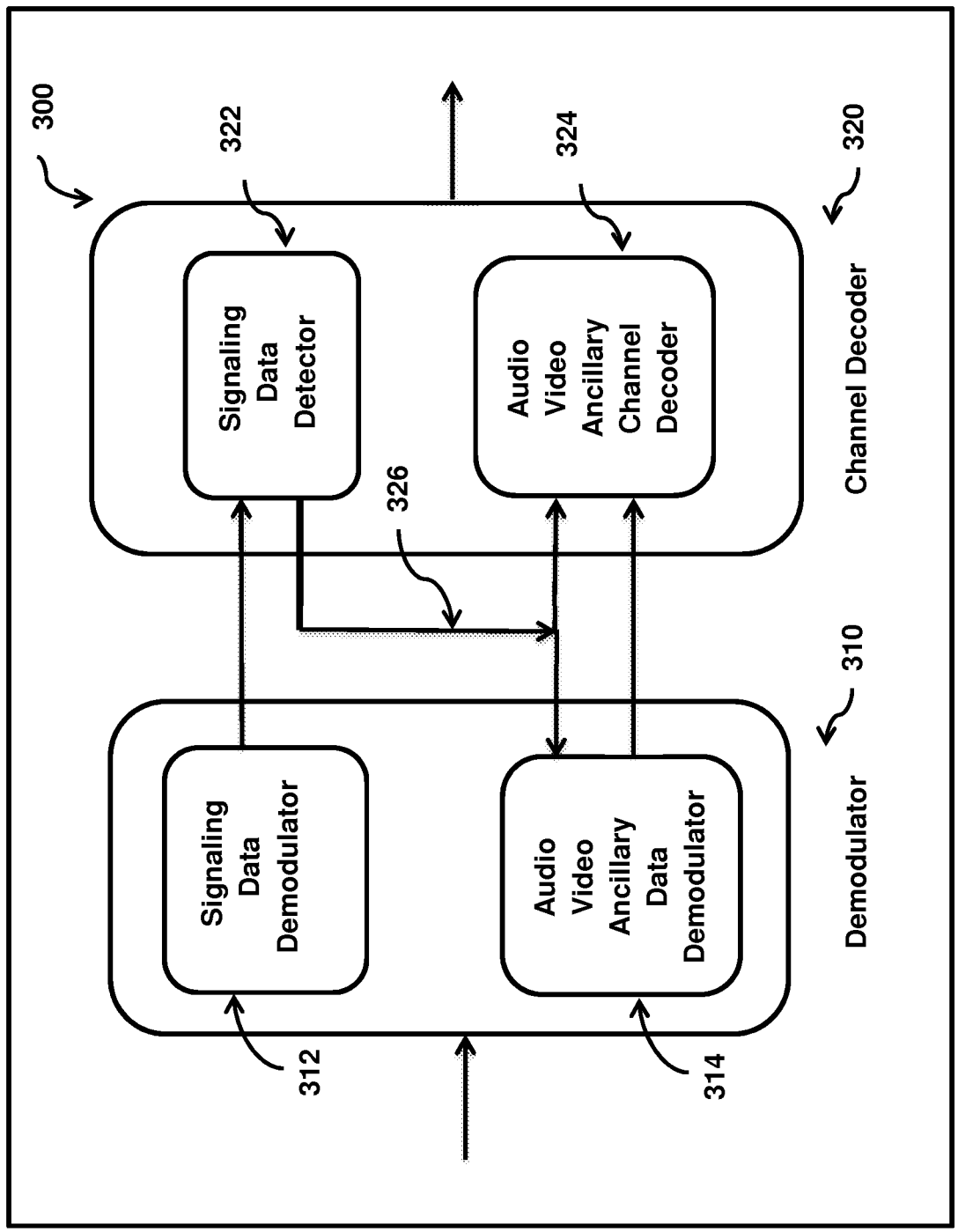
FIG. 3 illustrates an exemplary demodulator and channel decoder according to the present principles.

FIG. 3 shows an exemplary block diagram according to the present principles depicting a multi-carrier demodulator 310 and channel decoder 320. The demodulator 310, for all practical purposes, can be shown as composed of two blocks: the signaling data demodulator 312 and the audio/video/ancillary data demodulator 314. The signaling data demodulator 312 demodulates the signaling data symbols and sends the demodulated signaling data symbols to the signaling data detector 322. At the signaling data detector 322, the signaling data 326 is recovered from several potential levels of interleaving, randomizing and channel encoding for protection of the data against channel impairments. Once the signaling data 326 is recovered (including the bandwidth parameter), it is then sent to other blocks of the receiver, including the audio/video/ancillary (non-signaling) data demodulator 314 and the audio/video/ancillary data channel decoder 324. These two blocks will demodulate and decode the audio, video and other ancillary (data other than signaling) data symbols as a function of the several signaling data parameters 326, including the bandwidth parameter.

Once the transition to the new system is completed and the pre-existing system ceases to exist after a period of time, the transmitters can set their bandwidth parameters to the normal and/or extended modes of operation. Since the bandwidth parameter is a part of the signaling data, it is transmitted on the stream and the receivers will be able to automatically adjust to the new operation mode, by acquiring the new signaling data and extracting the new bandwidth parameter. That way, the system makes the best utilization of the spectrum at all times and without a major service interruption.

In one embodiment of the present principles, the new multi-carrier modulated signal is a DVB-T2 type of signal, that is, a signal that has a frame, super-frame and physical layer pipe (PLP) architecture, modulation, FEC and signaling etc. defined similarly to DVB-T2, but with the addition of some important changes to accommodate new conditions and transmission systems not envisioned by the DVB-T2 standard body. In an exemplary embodiment, the present principles can be implemented for DVB-T2 type systems by adding a signaling bit to the pre-existing L1 signaling data, such that the parameter BWT_EXT can now be defined as in Table 1.

TABLE 1

| BWT_EXT value | Mode | Number of Carriers |
|---|---|---|
| 00 | normal mode | $N_o$ |
| 01 | extended carrier mode | $N_1$ |
| 10 | Reduced carrier mode 0 | $N_2$ |
| 11 | Reduced carrier mode 1 | $N_3$ |

According to Table 1, extended carrier mode implies a larger number of carriers than the normal mode and reduced carrier mode implies a smaller number of carriers than the normal mode. When the BWT_EXT value is "00", the transmission system operates in normal mode of operation, with a normal number of carriers $N_0$; when the BW_EXT value is "01", the system operates in extended carrier mode of operation, with an extended number of carriers $N_1$; when the BW_EXT value is "10", the system operates in reduced carrier mode 0, with a reduced number of carriers $N_2$; and when the BW_EXT value is "11", the system operates in reduced carrier mode 1, with a reduced number of carriers $N_3$. According to an embodiment of the present principles, the number of carriers can be such that: $N_3<N_2<N_0<N_1$.

Figure 4:
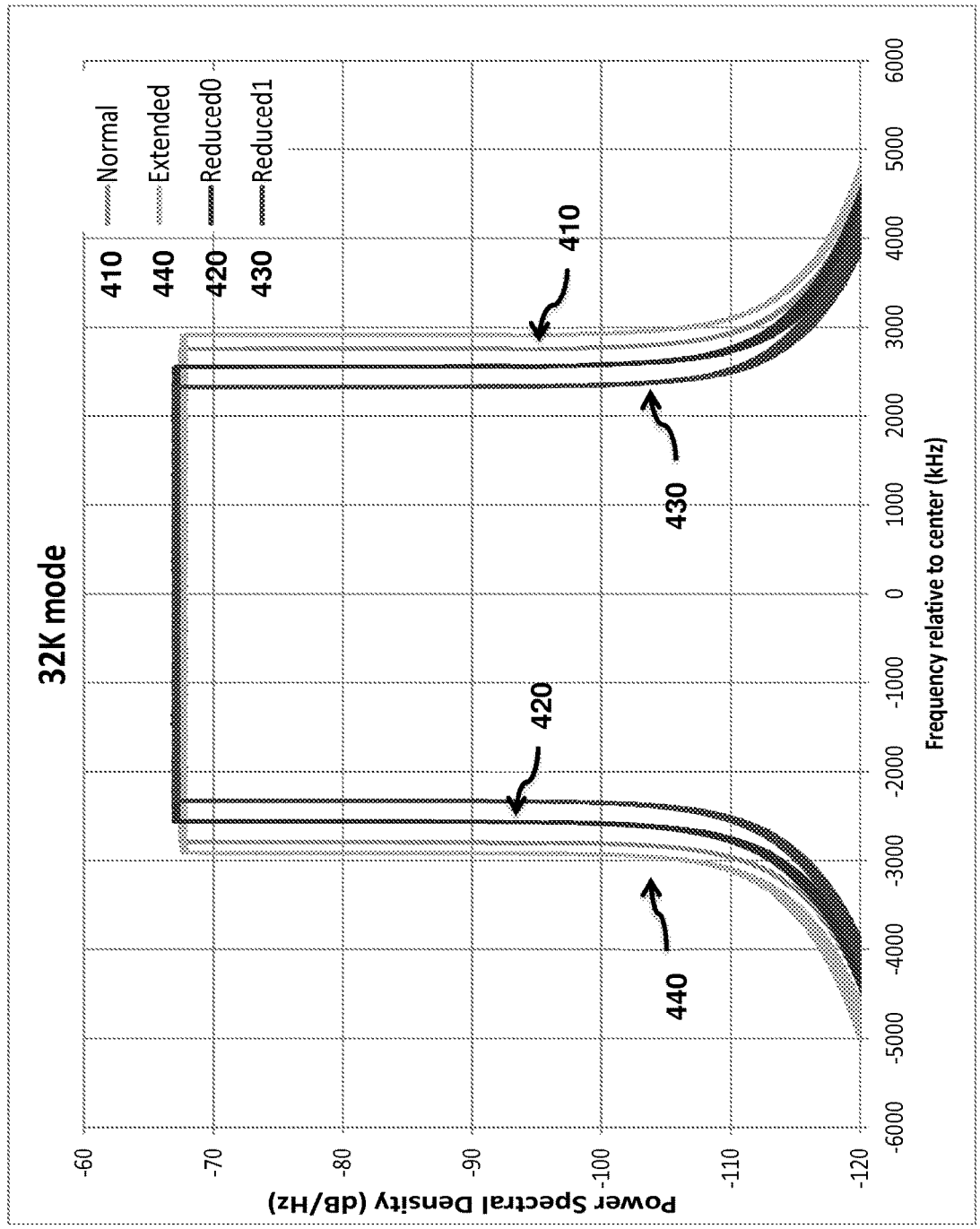
FIG. 4 illustrates an exemplary spectrum of the transmission signal as a function of the bandwidth parameter according to the present principles.
Figure 5:
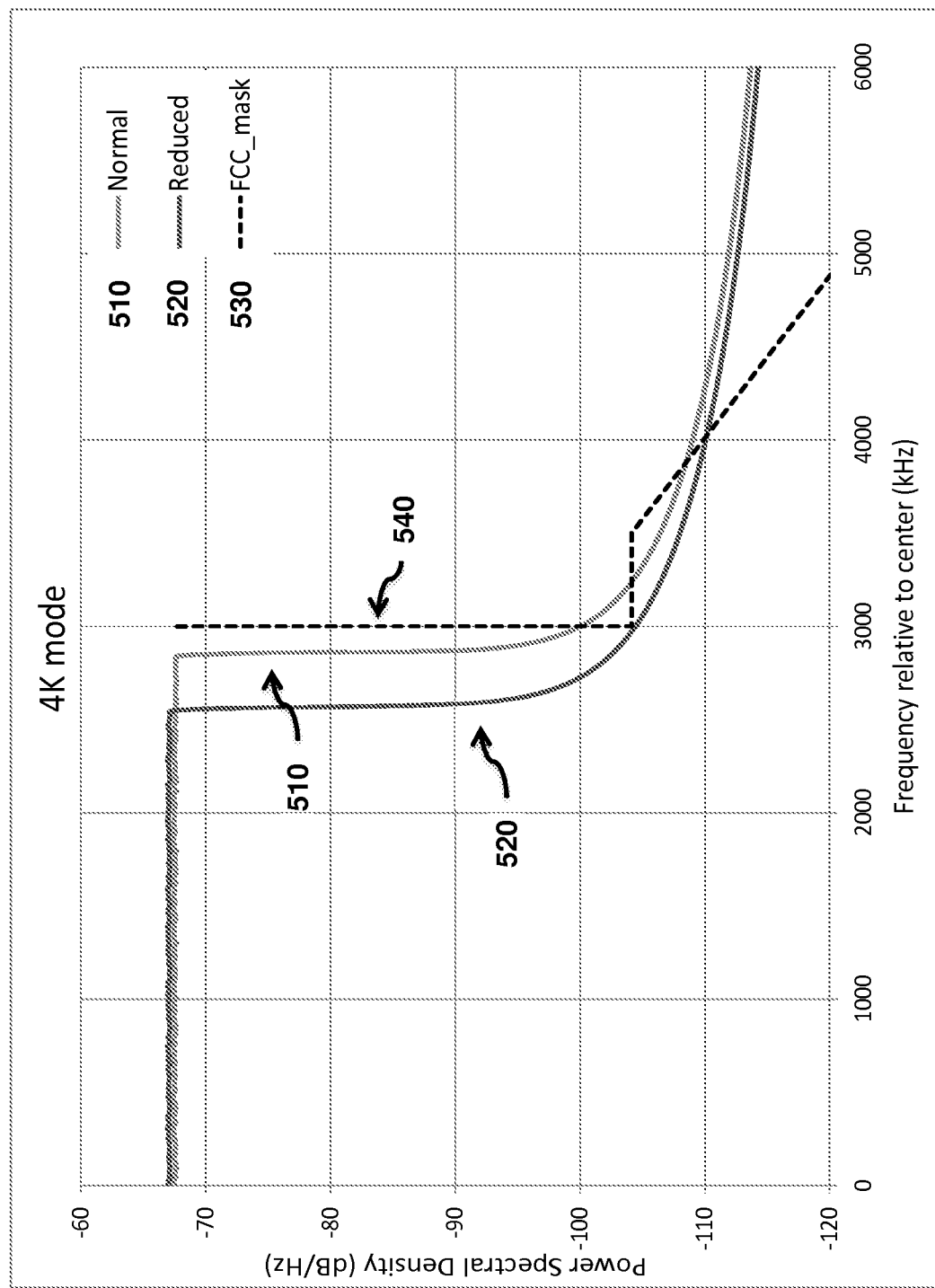
FIG. 5 illustrates an exemplary spectrum of the transmission signal according to the present principles for an FFT size parameter of 4K.
Figure 6:
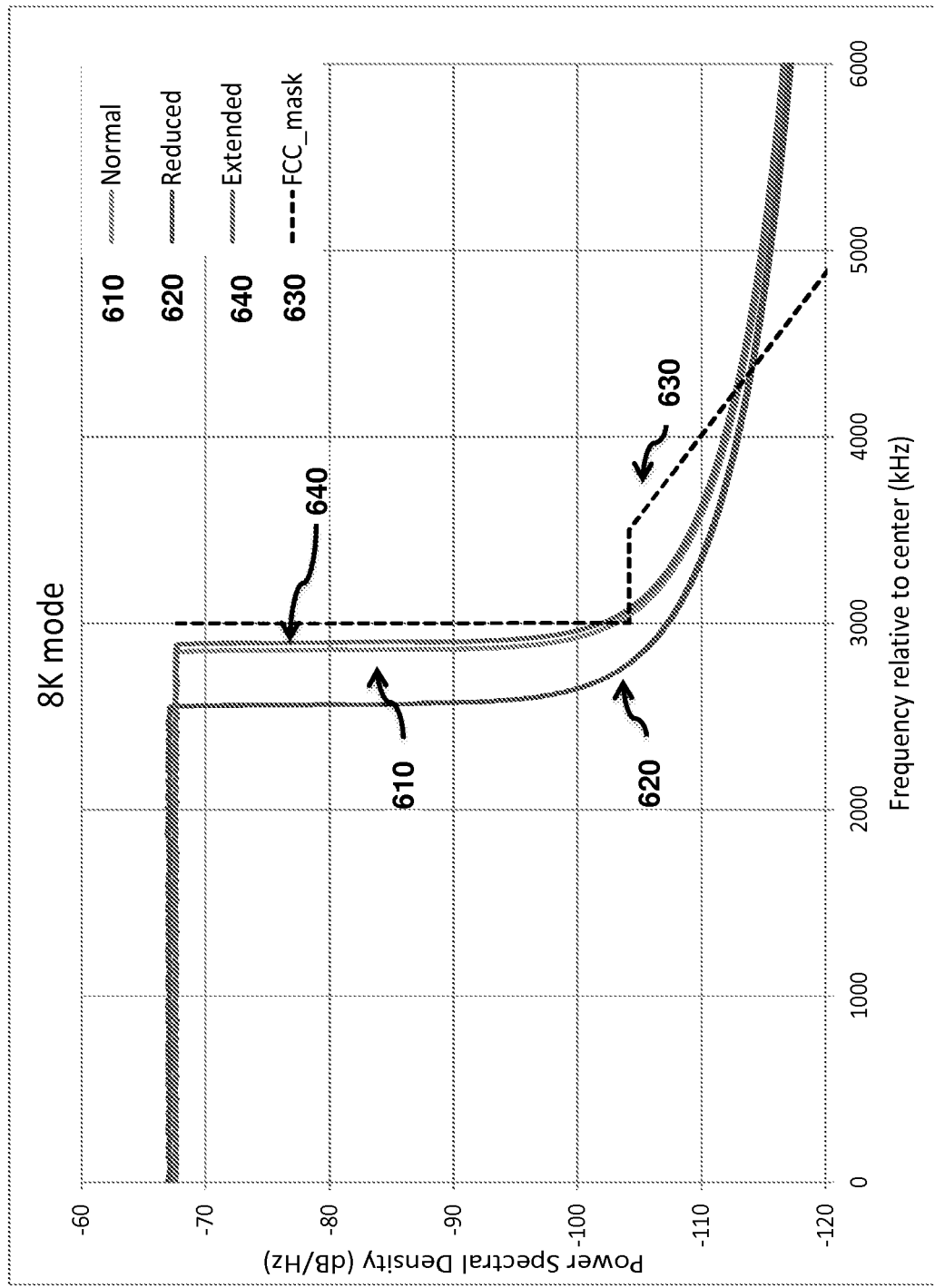
FIG. 6 illustrates an exemplary spectrum of the transmission signal according to the present principles for an FFT size parameter of 8K.
Figure 7:
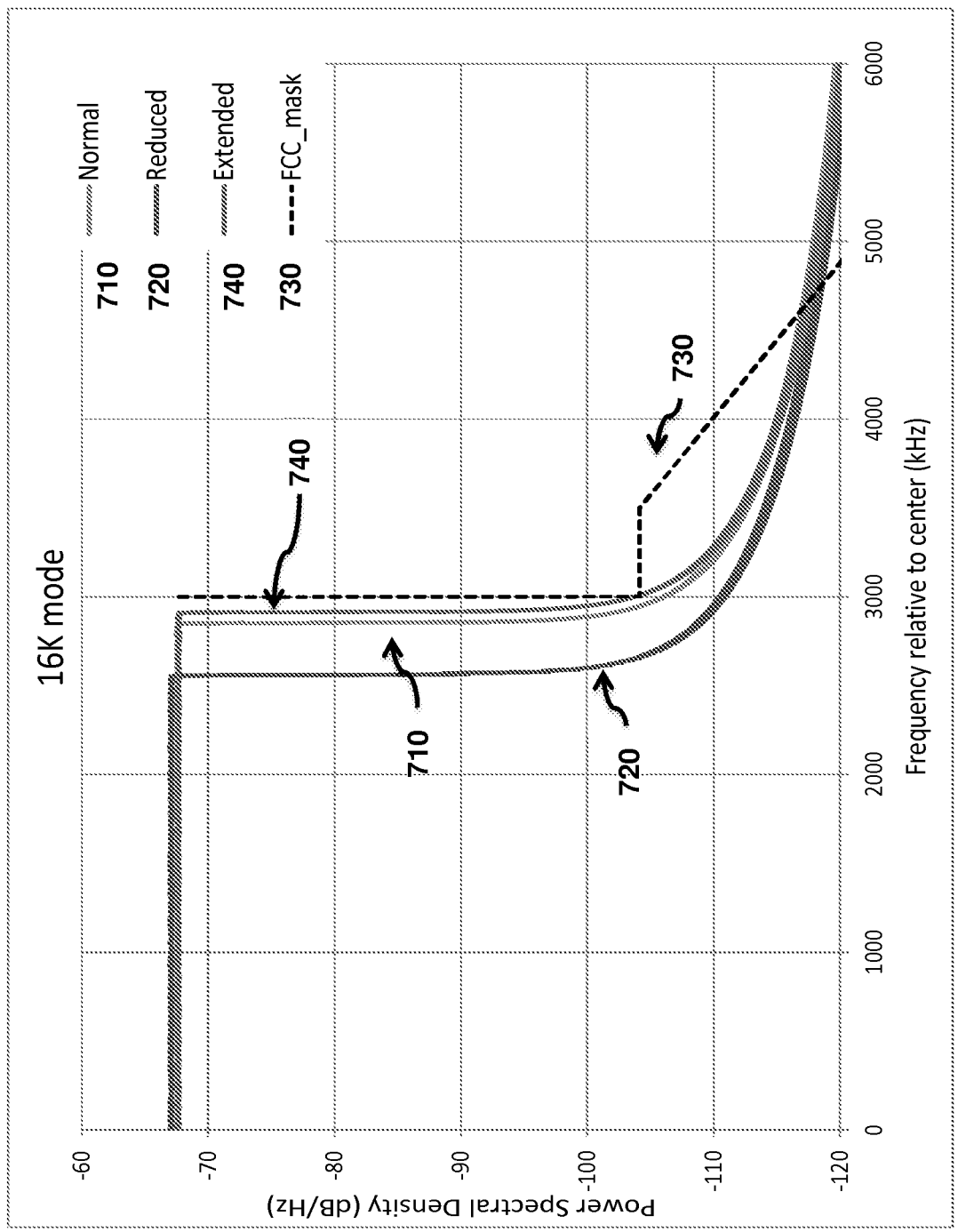
FIG. 7 illustrates an exemplary spectrum of the transmission signal according to the present principles for an FFT size parameter of 16K.
Figure 8:
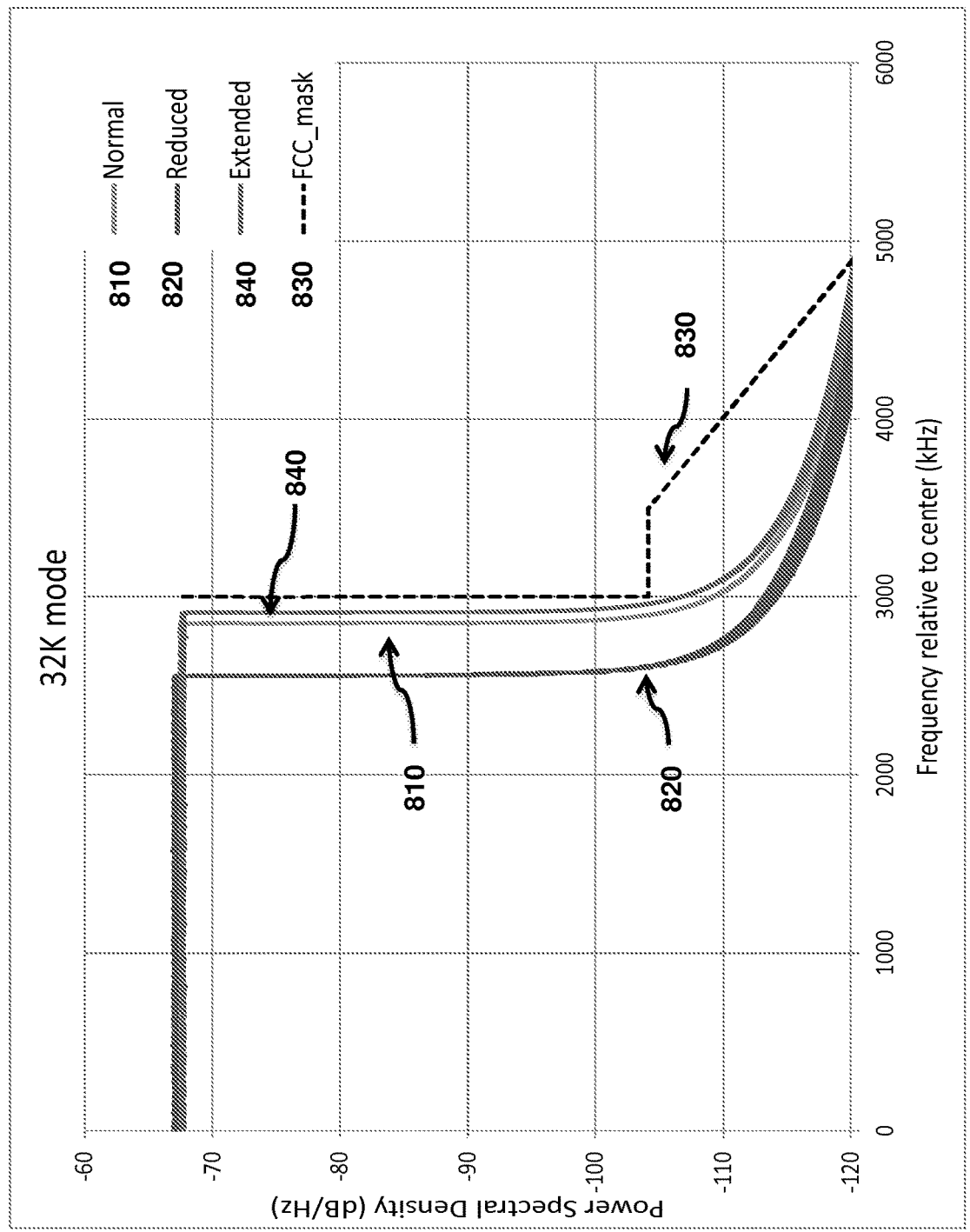
FIG. 8 illustrates an exemplary spectrum of the transmission signal according to the present principles for an FFT size parameter of 32K.

FIG. 4 shows an exemplary spectrum of the transmission signal according to the present principles derived from a DVB-T2 signal for a 6 MHz channel bandwidth (which is the US channel bandwidth), and FFT size of 32K, for a Normal carrier mode 310, Extended carrier mode 340, Reduced carrier mode 0 320 and Reduced carrier mode 1 330. FIG. 4 shows the relationship between the modes in Table 1 and the corresponding bandwidth of their transmitted signal: the smaller the number of carriers, the smaller the bandwidth will be. Therefore, adjacent channel interference can be appropriately dealt with on a system by system basis, by setting the appropriate mode.

In one embodiment of the present principles, the pre-existing or legacy modulated signal is the ATSC DTT signal currently in operation in the US and other countries.

In an exemplary embodiment, $N_1$ and $N_0$ may satisfy the DVB-T2 normal and extended bandwidth settings; $N_2$ may represent an up to 8% reduction of $N_0$ and $N_3$ may represent an up to 15% reduction of $N_0$.

Table 2 shows the number of carriers of an exemplary system according to the present principles derived from a DVB-T2 system, when $N_3$ represents a 10-11% reduction of $N_0$. In particular, it shows for each FFT mode (1 K to 32K) the total number of carriers (Ktotal), the minimum (K min) and maximum carrier number (K max), the number of carriers removed from each side of the signal spectrum (Kred), assuming a symmetric removal of carriers, and the spacing between K min and K max for reduced, normal and extended modes. The reduction in the number of carriers represents a reduction in occupied bandwidth by 600 KHz and an approximate 1.5 dB improvement in adjacent channel interference rejection.

TABLE 2

| Parameter | | 1K mode | 2K mode | 4K mode | 8K mode | 16K mode | 32K mode |
|---|---|---|---|---|---|---|---|
| Number of carrier Ktotal | reduced carrier mode | 763 | 1525 | 3055 | 6115 | 12229 | 24457 |
| | normal carrier mode | 853 | 1705 | 3409 | 6817 | 13633 | 27265 |
| | extended carrier mode | NA | NA | NA | 6913 | 13921 | 27841 |
| Value of carrier number Kmin | reduced carrier mode | 0 | 0 | 0 | 0 | 0 | 0 |
| | normal carrier mode | 0 | 0 | 0 | 0 | 0 | 0 |
| | extended carrier mode | NA | NA | NA | 0 | 0 | 0 |
| Value of carrier number Kmax | reduced carrier mode | 762 | 1524 | 3054 | 6114 | 12228 | 24456 |
| | normal carrier mode | 852 | 1704 | 3408 | 6816 | 13632 | 27264 |
| | extended carrier mode | NA | NA | NA | 6912 | 13920 | 27840 |
| Number of carriers removed on each side in reduced carrier mode 1 Kred | | 45 | 90 | 177 | 351 | 702 | 1404 |
| Number of carriers added on each side in extended carrier mode Kext (see note 2) | | 0 | 0 | 0 | 48 | 144 | 288 |
| Duration Tu (in T unit) | | 1024 | 2048 | 4096 | 8192 | 16384 | 32768 |
| Duration Tu (in μs) | | 149 | 299 | 597 | 1195 | 2389 | 4779 |
| carrier spacing 1/Tu (Hz) | | 6696 | 3348 | 1674 | 837 | 419 | 209 |
| Spacing between carriers Kmin and K max (MHz) (Ktotal − 1)/Tu | reduced carrier mode | 5.103 | 5.103 | 5.113 | 5.118 | 5.118 | 5.118 |
| | normal carrier mode | 5.705 | 5.705 | 5.705 | 5.705 | 5.705 | 5.705 |
| | extended carrier mode | NA | NA | NA | 5.786 | 5.826 | 5.826 |

FIGS. 5 to 8 show exemplary one-sided symmetrical spectra of the transmission signal of Table 2, for a 6 MHz channel bandwidth and FFT sizes of 4K, 8K, 16K and 32K, respectively. In FIGS. 5 to 8, plots of the Normal (510, 610, 710, 810), Reduced (reduced carrier mode, 520, 620, 720, 820) and Extended modes (when applicable, 640, 740, 840) are shown against the Federal Communications Commission (FCC) mask for the ATSC broadcasting transmission signal (530, 630, 730, 830). It is evident from the figures that the lower FFT modes (4K and 8K) extend beyond the mask and the higher FFT modes (16K and 32K) are very close to the mask. By applying a reduction to these modes, as shown in the figures, the transmission signal is made to satisfy the mask so as not to interfere with the ATSC legacy installed base, while the two systems co-exist.

Table 3 shows the Adjacent Channel Leakage Power Ratio (ACLR) for the transmission signal of Table 2 and FIGS. 4 to 7, under the various parameters. In addition, the ACLR values are shown when an additional filter is applied to the modulator output. This filter is simple and easily implemented. It has 201 taps, cut-off frequency Fc of 3.24 MHz and a Kaiser-Bessel window with alpha=10. A skilled artisan will appreciate that additional filtering will introduce intersymbol interference (ISI) in the signal and a penalty on the Modulation Error Rate (MER), which is also shown in Table 3.

In one embodiment, by properly balancing the reduction in the number of carriers, and corresponding reduction in throughput, with the ISI and MER penalty of the filter, an optimal solution may be accomplished, which satisfies the FCC mask and the broadcasters' demands for high bit rate and performance.

In addition, a skilled artisan will appreciate that different modes may be subject to different levels of reduction. For example, the lower FFT modes may be given a 12% reduction, while to higher FFT modes may be given a 9% reduction. Furthermore, the reduction of carriers may be asymmetrical on both sides of the spectrum, may be on just one side of the spectrum and may not need to affect every channel of the spectrum for which the new system applies. For example, in a channel for which the signal is according to the present principles, its lower adjacent channel is ATSC and the upper adjacent channel is also according to the present principles, reduction of carriers may just be applied to the lower side of the spectrum. The reduction of carriers may equivalently be applied to both sides of the spectrum with a shift in center frequency applied to the channel to shift the center frequency towards the upper adjacent channel, therefore more easily satisfying the requirement on the lower adjacent side of the channel and vice-versa.

TABLE 3

| Parameters | | 1K mode | 2K mode | 4K mode | 8K mode | 16K mode | 32K mode |
|---|---|---|---|---|---|---|---|
| ACLR (dB) | reduced carrier mode | −38 | −41 | −44.2 | −47.1 | −50.3 | −53.2 |
| | normal carrier mode | −37 | −40 | −42.7 | −45.7 | −48.7 | −52 |
| | extended carrier mode | NA | NA | NA | −45.5 | −48.4 | −51.1 |
| ACLR (dB) with FIR filters on IQ | reduced carrier mode | −48 | −50.6 | −53.8 | −56.7 | −60 | −63 |
| | normal carrier mode | −44.7 | −47.8 | −50.3 | −53.4 | −56.4 | −59.5 |
| | extended carrier mode | NA | NA | NA | −52.6 | −54.8 | −57.7 |
| MER (dB) after the | reduced carrier mode | 45.7 | 48.3 | 51 | 53.4 | 54.6 | 56.4 |

TABLE 3-continued

| Parameters | | 1K mode | 2K mode | 4K mode | 8K mode | 16K mode | 32K mode |
|---|---|---|---|---|---|---|---|
| FIR filters | normal carrier mode | 44 | 47.3 | 49.8 | 51.6 | 53.6 | 57 |
| | extended carrier mode | NA | NA | NA | 51.6 | 54.2 | 53.7 |

Figure 9:
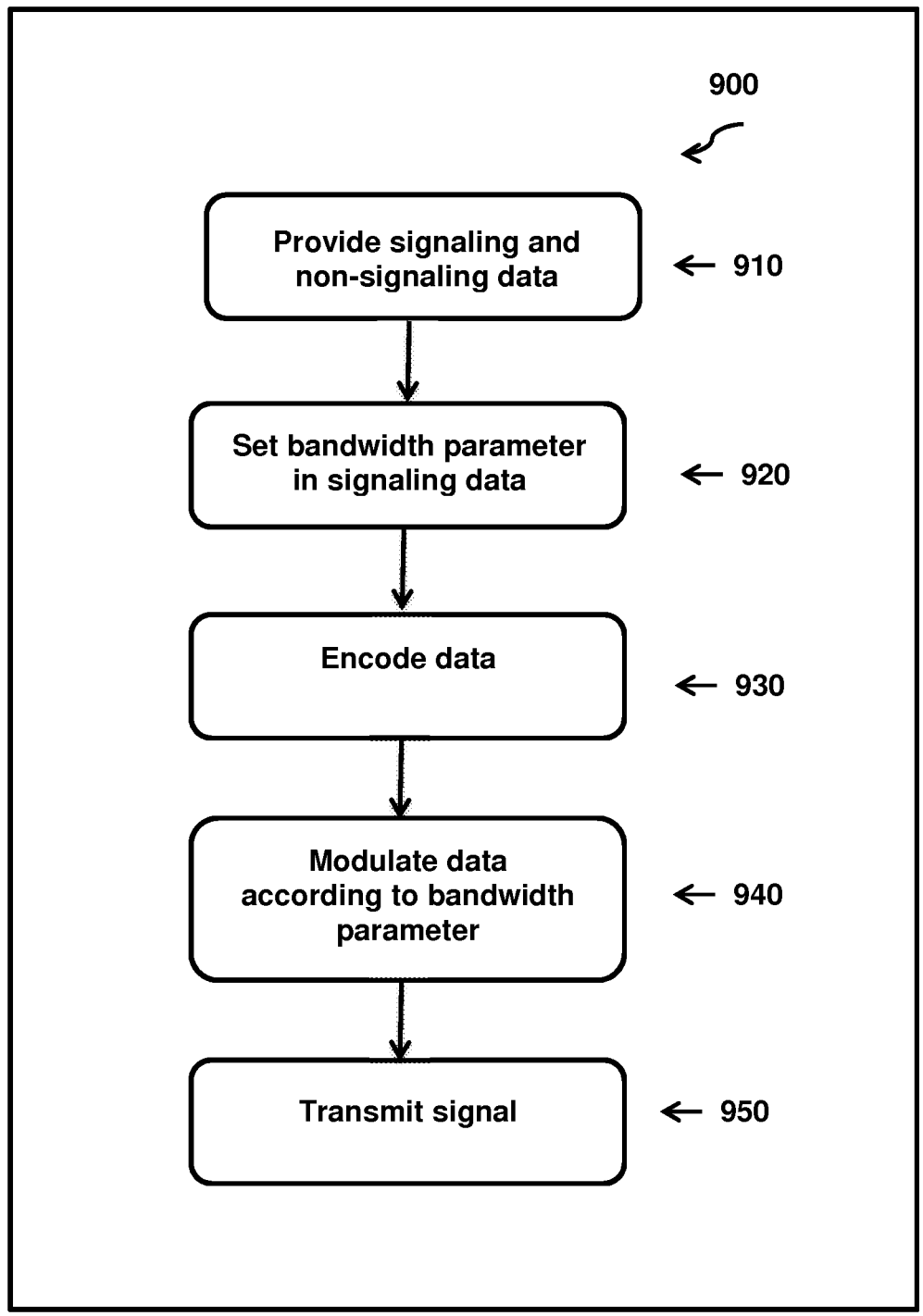
FIG. 9 illustrates a flowchart of a method for transmitting a signal according to the present principles.

FIG. 9 shows a flowchart 900 of a method for transmitting a signal according to the present principles. Initially, data is provided 910, including signaling and non-signaling data from source 111 or 200. The signaling data includes a bandwidth parameter which is set 920 according to a normal, at least one reduced or at least one extended mode, as in the example of Table 1. The data may be encoded 930 according to a source encoder 112 and/or channel encoder 115. The data is then allocated to multiple carriers in multiple modulation symbols according to the setting of the bandwidth parameter 940. Finally, the modulated signal transmitted 950. A reduced bandwidth mode may be created by evenly eliminating normal bandwidth carriers on both edges of the spectrum of the modulated signal. Also, a reduced bandwidth mode may be created by eliminating normal bandwidth carriers on only one edge of the spectrum of the modulated signal. This would be desirable when only one side of the spectrum presents an adjacent channel interference problem. Or a reduced bandwidth mode may be created by eliminating normal bandwidth carriers unevenly on both edges of the spectrum of the modulated signal. This would be desirable if the two adjacent channels present distinct interference problems.

Figure 10:
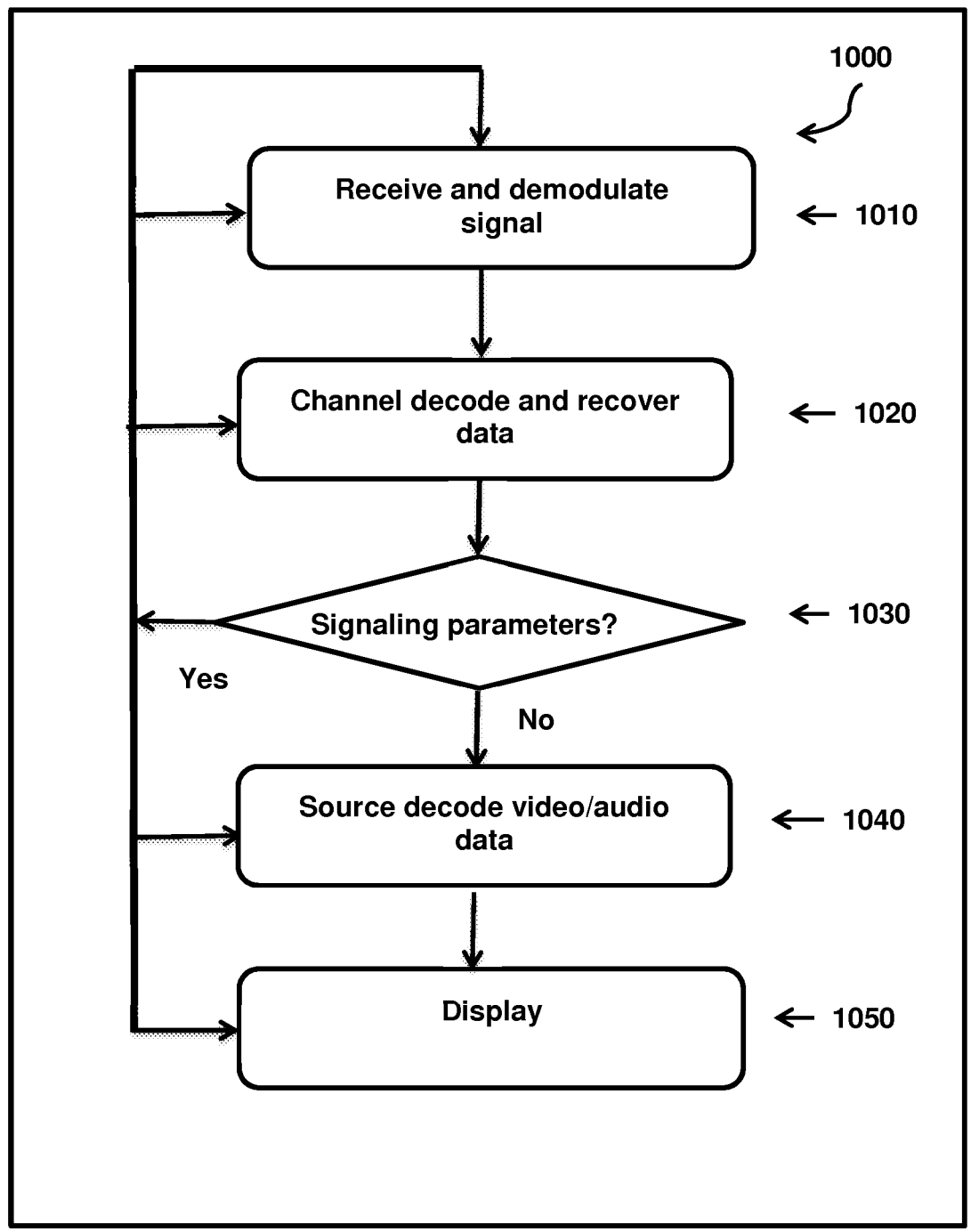
FIG. 10 illustrates a flowchart of a method for receiving a signal according to the present principles.

FIG. 10 shows a flowchart 1000 of a method for receiving a signal according to the present principles. The signal is received and initially demodulated 1010 to recover signaling parameters. The signaling parameters and non-signaling data may or may not be channel encoded, in which case they are first channel decoded 1020 to recover the signaling and non-signaling data. Once the signaling parameters are recovered and identified 1030, they are fed to the various blocks to specifically set up their functionalities according to the values of the parameters. In particular, one of the signaling parameters to be recovered is the bandwidth parameter, which will influence the demodulation of additional symbols according to the bandwidth mode set up at the transmitter side. The non-signaling data may be source decoded (or decompressed) 1040 and finally sent to an audio/video display device 1050.

In view of the above, the foregoing merely illustrates the present principles, and it will thus be appreciated that those skilled in the art will be able to devise numerous alternative arrangements which, although not explicitly described herein, embody the present principles and are within its spirit and scope. For example, although illustrated in the context of separate functional elements, the various functional elements of a transmitter and/or receiver may be embodied in one, or more, integrated circuits (ICs). Similarly, although shown as separate elements, any or all of the elements may be implemented in a stored-program-controlled processor, e.g., a digital signal processor, which executes associated software, e.g., corresponding to one, or more, of steps. In addition, the present principles may apply to other multi-carrier modulation systems besides OFDM, e.g., discrete multi-tone (DMT) and to other types of single-carrier or multi-carrier pre-existing or legacy systems besides 8-VSB, e.g., single carrier QAM modulation. Further, the present principles are applicable to other types of communications systems, e.g., Wireless-Fidelity (Wi-Fi), cellular, cable, satellite, etc. Indeed, the inventive concept is also applicable to stationary or mobile receivers. It is therefore to be understood that numerous modifications may be made to the illustrative embodiments and that other arrangements may be devised without departing from the spirit and scope of the present principles.

The invention claimed is:

1. An apparatus for transmitting a multi-carrier modulated signal comprising:
   a source that provides data, said data comprising a bandwidth parameter, said bandwidth parameter comprising a normal bandwidth mode, at least one reduced bandwidth mode and at least one extended bandwidth mode; and
   a multi-carrier modulator that modulates said data by allocating said data to a plurality of carriers within one physical channel according to said bandwidth parameter to create said multi-carrier modulated signal, wherein each bandwidth mode determines a number of carriers within the one physical channel,
   wherein the at least one reduced bandwidth mode has a smaller number of carriers than the normal bandwidth mode and the at least one extended bandwidth mode and wherein the at least one reduced bandwidth mode is used for reducing adjacent channel interference on at least one adjacent channel to said physical channel carrying said multi-carrier modulated signal.

2. The apparatus according to claim 1 wherein the at least one extended bandwidth mode has a larger number of carriers than the normal bandwidth mode.

3. The apparatus according to claim 1 further comprising:
   a channel encoder for at least channel encoding said data prior to the multi-carrier modulator.

4. The apparatus according to claim 1 wherein at least one reduced bandwidth mode is created by eliminating normal bandwidth mode carriers evenly on both edges of a spectrum of said multi-carrier modulated signal.

5. The apparatus according to claim 1 wherein at least one reduced bandwidth mode is created by eliminating normal bandwidth mode carriers on only one edge of a spectrum of said multi-carrier modulated signal.

6. The apparatus according to claim 1 wherein at least one reduced bandwidth mode is created by eliminating normal bandwidth mode carriers unevenly on both edges of a spectrum of said multi-carrier modulated signal.

7. The apparatus according to claim 1 wherein the at least one adjacent channel carries a modulated signal satisfying a spectral mask for a legacy communication system.

8. The apparatus according to claim 7 wherein the legacy communication system is ATSC and the multi-carrier modulation is OFDM.

9. An apparatus for receiving a multi-carrier modulated signal comprising:
   a multi-carrier demodulator that demodulates said multi-carrier modulated signal, said multi-carrier modulated signal comprising a plurality of signaling data and other than signaling data modulated symbols, said modulated symbols comprising a plurality of carriers within one physical channel, to obtain demodulated data symbols, wherein demodulating said other than signaling data symbol is performed according to a bandwidth parameter; and
   a signaling data detector that detects signaling data from demodulated signaling data symbols and that recovers said bandwidth parameter, said bandwidth parameter comprising a normal bandwidth mode, at least one reduced bandwidth mode and at least one extended bandwidth mode, wherein each bandwidth mode determines a number of carriers within the one physical channel, wherein the at least one reduced bandwidth mode has a smaller number of carriers than the normal bandwidth mode and the at least one extended bandwidth mode and wherein the at least one reduced bandwidth mode is used for reducing adjacent channel interference on at least one adjacent channel to said physical channel carrying said multi-carrier modulated signal.

10. The apparatus according to claim 9 wherein and the at least one extended bandwidth mode has a larger number of carriers than the normal bandwidth mode.

11. The apparatus according to claim 9 further comprising:
a channel decoder for at least channel decoding said demodulated data symbols after the multi-carrier demodulator.

12. The apparatus according to claim 9 wherein at least one reduced bandwidth mode is created by eliminating normal bandwidth mode carriers evenly on both edges of a spectrum of said multi-carrier modulated signal and the multi-carrier demodulator disregards eliminated carriers.

13. The apparatus according to claim 9 wherein at least one reduced bandwidth mode is created by eliminating normal bandwidth mode carriers on only one edge of a spectrum of said multi-carrier modulated signal and the multi-carrier demodulator disregards eliminated carriers.

14. The apparatus according to claim 9 wherein at least one reduced bandwidth mode is created by eliminating normal bandwidth mode carriers unevenly on both edges of a spectrum of said multi-carrier modulated signal and the multi-carrier demodulator disregards eliminated carriers.

15. The apparatus according to claim 9 wherein the at least one adjacent channel carries a modulated signal satisfying a spectral mask for a legacy communication system.

16. The apparatus according to claim 15 wherein the legacy communication system is ATSC and the multi-carrier modulation is OFDM.

17. The apparatus of claim 9 wherein the multi-carrier demodulator for the signaling data symbols which do not contain the bandwidth parameter performs demodulation according to the bandwidth parameter.

18. A method for transmitting a multi-carrier modulated signal comprising:
providing data, said data comprising a bandwidth parameter, said bandwidth parameter comprising a normal bandwidth mode, at least one reduced bandwidth mode and at least one extended bandwidth mode; and
multi-carrier modulating said data by allocating said data to a plurality of carriers within one physical channel according to said bandwidth parameter to create said multi-carrier modulated signal, wherein each bandwidth mode determines a number of carriers within the one physical channel,
wherein the at least one reduced bandwidth mode has a smaller number of carriers than the normal bandwidth mode and the at least one extended bandwidth mode and
wherein the at least one reduced bandwidth mode is used for reducing adjacent channel interference on at least one adjacent channel to said physical channel carrying said multi-carrier modulated signal.

19. The method according to claim 18 wherein the at least one extended bandwidth mode has a larger number of carriers than the normal bandwidth mode.

20. The method according to claim 18 further comprising:
channel encoding said data prior to multi-carrier modulating.

21. The method according to claim 18 wherein at least one reduced bandwidth mode is created by eliminating normal bandwidth mode carriers evenly on both edges of a spectrum of said multi-carrier modulated signal.

22. The method according to claim 18 wherein at least one reduced bandwidth mode is created by eliminating normal bandwidth mode carriers on only one edge of a spectrum of said multi-carrier modulated signal.

23. The method according to claim 18 wherein at least one reduced bandwidth mode is created by eliminating normal bandwidth mode carriers unevenly on both edges of a spectrum of said multi-carrier modulated signal.

24. The method according to claim 18 wherein the at least one adjacent channel carries a modulated signal satisfying a spectral mask for a legacy communication system.

25. The method according to claim 24 wherein the legacy communication system is ATSC and the multi-carrier modulation is OFDM.

26. A method for receiving a multi-carrier modulated signal comprising:
multi-carrier demodulating said multi-carrier modulated signal, said multi-carrier modulated signal comprising a plurality of signaling data and other than signaling data modulated symbols, said modulated symbols comprising a plurality of carriers within one physical channel, to obtain demodulated data symbols, wherein demodulating said other than signaling data symbol is performed according to a bandwidth parameter; and
detecting signaling data from demodulated signaling data symbols and for recovering said bandwidth parameter, said bandwidth parameter comprising a normal bandwidth mode, at least one reduced bandwidth mode and at least one extended bandwidth mode, wherein each bandwidth mode determines a number of carriers within the one physical channel,
wherein the at least one reduced bandwidth mode has a smaller number of carriers than the normal bandwidth mode and the at least one extended bandwidth mode and
wherein the at least one reduced bandwidth mode is used for reducing adjacent channel interference on at least one adjacent channel to said physical channel carrying said multi-carrier modulated signal.

27. The method according to claim 26 wherein the at least one extended bandwidth mode has a larger number of carriers than the normal bandwidth mode.

28. The method according to claim 26 further comprising:
channel decoding said demodulated data symbols after the multicarrier demodulator.

29. The method according to claim 26 wherein at least one reduced bandwidth mode is created by eliminating normal bandwidth mode carriers evenly on both edges of a spectrum of said multi-carrier modulated signal and the multi-carrier demodulator disregards eliminated carriers.

30. The method according to claim 26 wherein at least one reduced bandwidth mode is created by eliminating normal bandwidth mode carriers on only one edge of a spectrum of said multi-carrier modulated signal and the multi-carrier demodulator disregards eliminated carriers.

31. The method according to claim 26 wherein at least one reduced bandwidth mode is created by eliminating normal bandwidth mode carriers unevenly on both edges of a spectrum of said multi-carrier modulated signal and the multi-carrier demodulator disregards eliminated carriers.

32. The method according to claim 26 wherein the at least one adjacent channel carries a modulated signal satisfying a spectral mask for a legacy communication system.

33. The method according to claim 32 wherein the legacy communication system is ATSC and the multi-carrier modulation is OFDM.

34. The method of claim 26 wherein demodulating the signaling data symbols which do not contain the bandwidth parameter is performed according to the bandwidth parameter.

* * * * *